(12) United States Patent
Nagaraj et al.

(10) Patent No.: US 11,271,776 B2
(45) Date of Patent: Mar. 8, 2022

(54) LOGICAL OVERLAY NETWORK MONITORING

(71) Applicant: VMware, Inc., Palo Alto, CA (US)

(72) Inventors: Uday Shankar Nagaraj, Sunnyvale, CA (US); Shyam Sambasivan Ramachandran, Mountain View, CA (US); Natalia Tupy Jensen, Los Gatos, CA (US); Mansi Babbar, Fremont, CA (US); Prerit Rodney, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 163 days.

(21) Appl. No.: 16/520,325

(22) Filed: Jul. 23, 2019

(65) Prior Publication Data
US 2021/0028958 A1 Jan. 28, 2021

(51) Int. Cl.
*H04L 12/46* (2006.01)
*H04L 12/713* (2013.01)
(Continued)

(52) U.S. Cl.
CPC ...... *H04L 12/4633* (2013.01); *G06F 9/45558* (2013.01); *H04L 12/4641* (2013.01);
(Continued)

(58) Field of Classification Search
CPC ............. H04L 12/4633; H04L 12/4641; H04L 45/586; H04L 61/2592; H04L 9/45558;
(Continued)

(56) References Cited

U.S. PATENT DOCUMENTS 7,606,203 B1 * 10/2009 Shabtay .............. H04L 12/4625
370/332
8,295,175 B2 * 10/2012 Ellis ...................... H04L 43/065
370/235
(Continued)

OTHER PUBLICATIONS

A. Gulenko, M. Wallschläger and O. Kao, "A Practical Implementation of In-Band Network Telemetry in Open vSwitch," 2018 IEEE 7th International Conference on Cloud Networking (CloudNet), 2018, pp. 1-4, doi: 10.1109/CloudNet.2018.8549431. (Year: 2018).*

*Primary Examiner* — Ayaz R Sheikh
*Assistant Examiner* — Tarell A Hampton
(74) *Attorney, Agent, or Firm* — Su IP Consulting

(57) ABSTRACT

Example methods and computer systems are provided for logical overlay network monitoring. The method may comprise: obtaining egress metric information associated with egress encapsulated packets that are sent by a source virtual tunnel endpoint (VTEP) to a destination VTEP over a logical overlay network; and obtaining ingress metric information associated with ingress encapsulated packets that are received by the destination VTEP from the source VTEP over the logical overlay network. The method may also comprise: performing a comparison to identify a divergence between the egress metric information and the ingress metric information; and based on the divergence, detecting a performance issue affecting logical overlay network connectivity between the source VTEP and the destination VTEP.

18 Claims, 9 Drawing Sheets

(51) Int. Cl.
  *H04L 29/12* (2006.01)
  *G06F 9/455* (2018.01)
  *H04L 12/26* (2006.01)
  *H04L 45/586* (2022.01)
  *H04L 61/2592* (2022.01)
  *H04L 43/08* (2022.01)

(52) U.S. Cl.
  CPC ............ *H04L 43/08* (2013.01); *H04L 45/586* (2013.01); *H04L 61/2592* (2013.01); *G06F 2009/4557* (2013.01); *G06F 2009/45595* (2013.01)

(58) Field of Classification Search
  CPC ........... H04L 43/08; G06F 2009/45595; G06F 2009/4557
  See application file for complete search history.

(56) References Cited

U.S. PATENT DOCUMENTS

| | | | |
|---|---|---|---|
| 9,306,837 B1* | 4/2016 | Jain | H04L 45/16 |
| 2002/0138611 A1* | 9/2002 | Roe | H04L 29/06 709/224 |
| 2005/0108601 A1* | 5/2005 | Driediger | H04L 43/0835 714/712 |
| 2005/0243731 A1* | 11/2005 | Smith | H04L 41/0681 370/241.1 |
| 2013/0346592 A1* | 12/2013 | Kamble | H04L 43/0894 709/224 |
| 2015/0103679 A1* | 4/2015 | Tessmer | H04L 43/50 370/252 |
| 2016/0344622 A1* | 11/2016 | Liu | H04L 12/4633 |
| 2016/0359673 A1* | 12/2016 | Gupta | G06F 21/53 |
| 2017/0317919 A1* | 11/2017 | Fernando | H04L 41/0806 |
| 2018/0013653 A1* | 1/2018 | Pai | H04L 43/0894 |

* cited by examiner

LOGICAL OVERLAY NETWORK MONITORING

BACKGROUND

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

Through virtualization of networking services in SDN environment 100, logical overlay networks may be provisioned, changed, stored, deleted and restored programmatically without having to reconfigure the underlying physical hardware architecture. In practice, traffic losses may occur in a physical network due to various reasons, such as congested paths, faulty or misconfigured equipment, isolated networks, etc. In this case, the performance of logical overlay networks implemented over the physical network will also be affected, which is undesirable.

DETAILED DESCRIPTION

Figure 1:
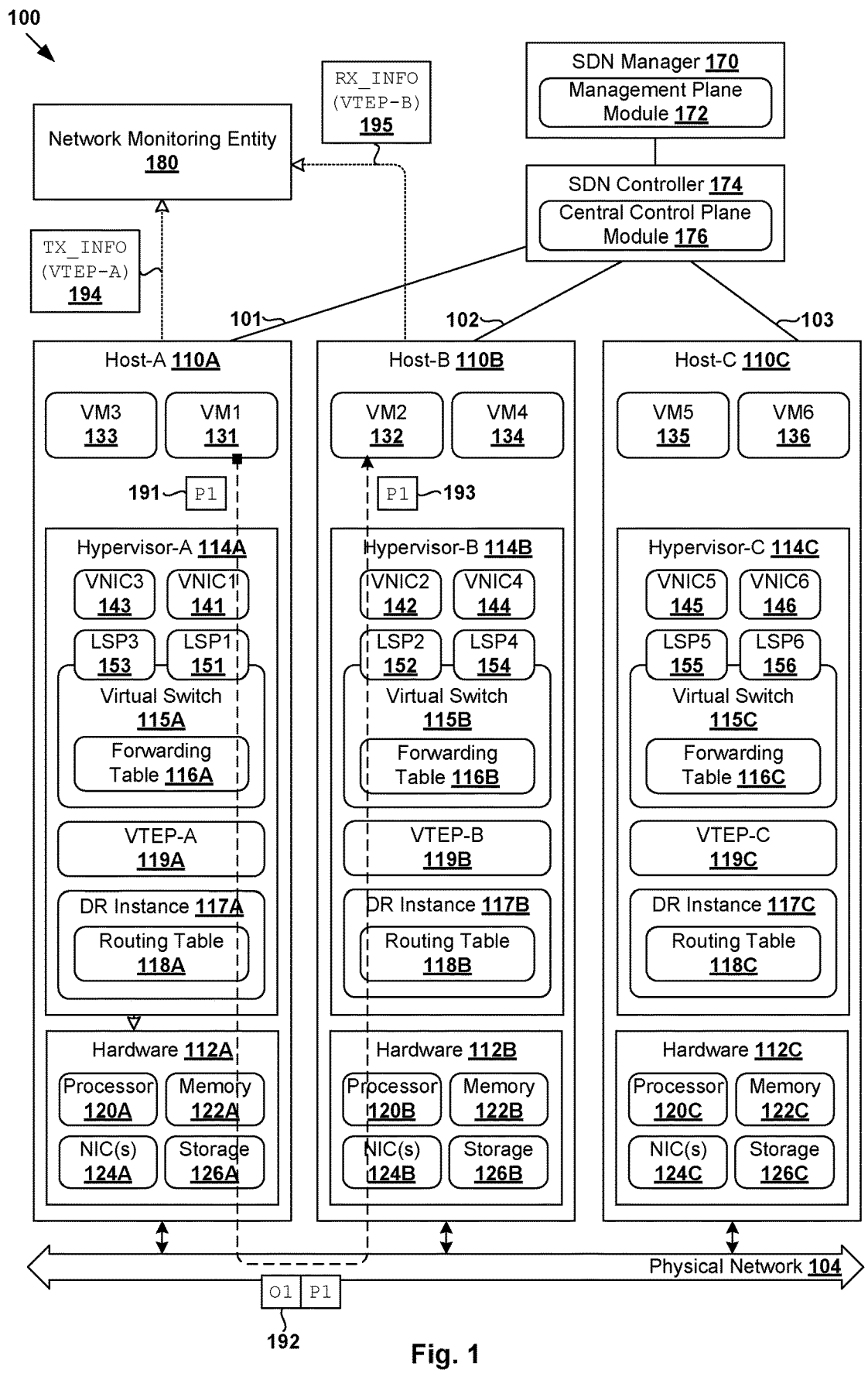
FIG. 1 is a schematic diagram illustrating an example software-defined networking (SDN) environment in which logical overlay network monitoring may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network monitoring will now be explained in more detail using FIG. 1, which is a schematic diagram illustrating example software-defined networking (SDN) environment 100 in which logical overlay network monitoring may be performed. It should be understood that, depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, there may be any number of hosts (also known as a "host computers", "host devices", "physical servers", "server systems", "transport nodes," etc.), where each host may be supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM3 133; host-B 110B supports VM2 132 and VM4 134; and host-C 110C supports VM5 135 VM6 136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 170 and SDN controller 174 are example network management entities in SDN environment 100. To send and receive the control information (e.g., configuration information), each host 110A/110B/110C may implement local control plane (LCP) agent (not shown) to interact with SDN controller 174. For example, control-plane channel 101/102/103 may be established between SDN controller 174 and host 110A/110B/110C using TCP over Secure Sockets Layer (SSL), etc. Management entity 170/174 may be implemented using physical machine(s), virtual machine(s), a combination thereof, etc.

Each host 110A/110B/110C also maintains data-plane connectivity with other host(s) via physical network 104. Hypervisor 114A/114B/114C may implement a virtual tunnel endpoint (VTEP) to encapsulate and decapsulate packets with an outer header (also known as a tunnel header) identifying a logical overlay network (e.g., VNI=6000). To facilitate communication among VMs located on the same logical overlay network, hypervisor-A 114A implements first VTEP-A 119A associated with (IP address=IP-A, MAC address=MAC-A, VTEP label=VTEP-A), hypervisor-B 114B implements second VTEP-B 119B with (IP-B, MAC-B, VTEP-B) and hypervisor-C 114C implements third VTEP-C 119C with (IP-C, MAC-C, VTEP-C). Encapsulated packets may be sent via a logical overlay tunnel established between a pair of VTEPs over physical network 104.

Through the growth of infrastructure-as-a-service (IaaS), multiple logical overlay networks may be deployed to support multiple tenants in SDN environment 100. For example, VMs on different physical hosts may be deployed on the same logical layer-2 segment. For example, a first group may be deployed on a first logical overlay network associated with virtual network identifier (VNI)=5000. A second group may be deployed on a second logical overlay network with VNI=6000. Depending on the desired implementation, each logical overlay network may be designed to be an abstract representation of a tenant's network in SDN environment 100.

As used herein, the term "logical overlay network" (also known as "logical network") may refer generally to a logical network that is implemented over physical network 104 using any suitable tunneling protocol, such as Virtual eXtensible Local Area Network (VXLAN), Stateless Transport Tunneling (STT), Generic Network Virtualization Encapsulation (GENEVE), etc. The term "logical overlay tunnel" may refer generally to a tunnel established between a pair of VTEPs over physical network 104, over which respective hosts are in layer-3 connectivity with one another.

In practice, logical overlay networks such as VXLAN and GENEVE may use UDP-based tunnels to transport packets. These tunnels are generally ephemeral in nature, in that that they only exist when transport is required. Using a connectionless transport protocol such as UDP, there is generally very little setup and monitoring of the tunnels. However, unlike TCP (i.e., connection-based), UDP does not provide any feedback on packet delivery to endpoints. The lack of visibility into such logical overlay tunnels makes it challenging to overcome any path congestion or failure that leads to performance degradation.

Logical Overlay Network Monitoring

According to examples of the present disclosure, logical overlay network monitoring may be implemented to identify performance issue(s) affecting the connectivity among VTEPs 119A-C in SDN environment 100. Examples of the present disclosure may be implemented to provide users (e.g., network administrators) with a tool for network diagnosis and troubleshooting. Through logical overlay network monitoring, network disruption may be identified and resolved to improve application performance and user experience in SDN environment 100.

Figure 2:
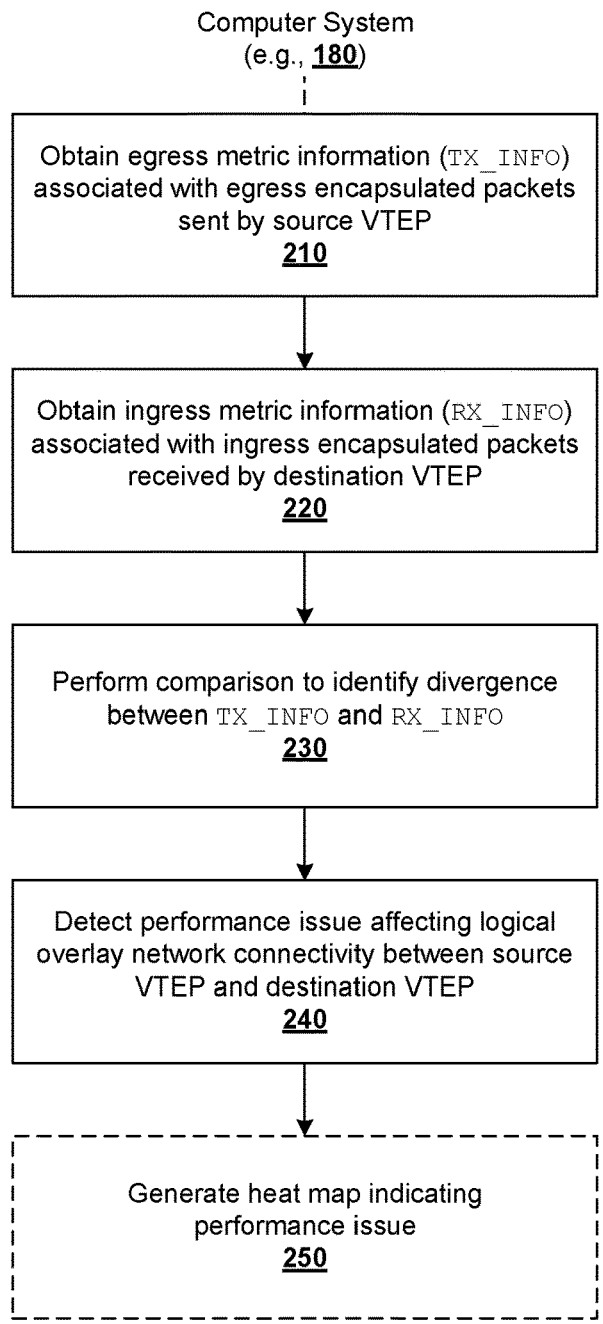
FIG. 2 is a flowchart of an example process for a computer system to perform logical overlay network monitoring.

In more detail, FIG. 2 is a flowchart of example process 200 for a computer system to perform logical overlay network monitoring. Example process 200 may include one or more operations, functions, or actions illustrated by one or more blocks, such as 210 to 240. The various blocks may be combined into fewer blocks, divided into additional blocks, and/or eliminated depending on the desired implementation. In practice, example process 200 may be implemented by any suitable "computer system," which may be physical machine(s) and/or VM(s) capable of acting as network monitoring entity 180. In the following, various examples will be discussed using FIG. 1, which shows an example VTEP pair that includes VTEP-A 119A ("source VTEP") on host-A 110A and VTEP-B 119B ("destination VTEP") on host-B 110B.

At 210 and 220 in FIG. 2, network monitoring entity 180 may obtain egress metric information (see "TX_INFO" 194 in FIG. 1) and ingress metric information (see "RX_INFO" 195 in FIG. 1). Here, the term "obtain" may refer generally to network monitoring entity 180 receiving or retrieving the metric information from a host or a data store in which the metric information is stored by the host). In the example in FIG. 1, source VTEP-A 119A and destination VTEP-B 119B are configured to facilitate communication between VM1 131 ("source virtualized computing instance") and VM2 132 ("destination virtualized computing instance") over a particular logical overlay network associated with VNI=5000.

In response to detecting egress packets (see 191) from VM1 131, source VTEP-A 119A may generate and send egress encapsulated packets (see 192) over a logical overlay network associated with VNI=5000. In this case, egress metric information 194 may be associated with egress encapsulated packets (see 192) that are sent by source VTEP-A 119A to destination VTEP-B 119B. In response to detecting ingress encapsulated packets (see 192), destination VTEP-B 119B may perform decapsulation and forward decapsulated packet (see 193) to VM2 132. In this case, ingress metric information 195 may be associated with ingress encapsulated packets (see 192) that are received by destination VTEP-B 119B from source VTEP-A 119A over the logical overlay network.

At 230 and 240 in FIG. 2, based on a divergence between egress metric information 194 and ingress metric information 195, network monitoring entity 180 may detect a performance issue affecting logical overlay network connectivity between source VTEP-A 119A and destination VTEP-B 119B. As will be described further using FIGS. 3-7B, metric information 194/195 may specify packet count (i.e., number of encapsulated packets 192), byte count (i.e., amount of data in encapsulated packets 192), etc. In practice, source host-A 110A and destination host-B 110B may be synchronized to generate and send metric information at multiple time points.

In one example, block 230 may involve performing a comparison to identify a divergence between (a) a first number of egress encapsulated packets 192 sent by source VTEP-A 119A at multiple time points, and (b) a second number of ingress encapsulated packets 192 received by destination VTEP-B 119A at the multiple time points. In another example, block 230 may involve performing a comparison to identify a divergence between (a) a first amount of data (e.g., byte count) in egress encapsulated packets 192 sent by source VTEP-A 119A at multiple time points, and (b) a second amount of data in ingress encapsulated packets 192 received by destination VTEP-B 119A at the multiple time points.

As will be discussed further using FIG. 8, network monitoring entity 180 may generate a heat map indicating whether the performance issue is detected for multiple VTEP pairs associated with logical overlay network(s), and the multiple VTEP pairs include (source VTEP-A 119A, destination VTEP-B 119A). Depending on the desired implementation, network monitoring entity 180 may perform remediation action(s) in response to detecting the performance issue at block 240. Example remediation actions may include triggering a migration of source VM1 131 or destination VM2 132, generating and sending a notification to a network administrator, etc. Examples of the present disclosure may be implemented for unicast traffic (see FIG. 5), multicast traffic or broadcast traffic (see FIG. 9)

Using examples of the present disclosure, egress metric information (e.g., sender-side tunnel statistics) may be correlated with ingress metric information (e.g., receiver-side tunnel statistics) to facilitate logical overlay network monitoring. In practice, the metric information is especially helpful in deployment scenarios where the management of physical networks and hypervisors is performed by different entities. Examples of the present disclosure may be implemented to collect more accurate metric information associated with logical overlay networks to facilitate improved network diagnosis and troubleshooting.

Example Configuration

Figure 3:
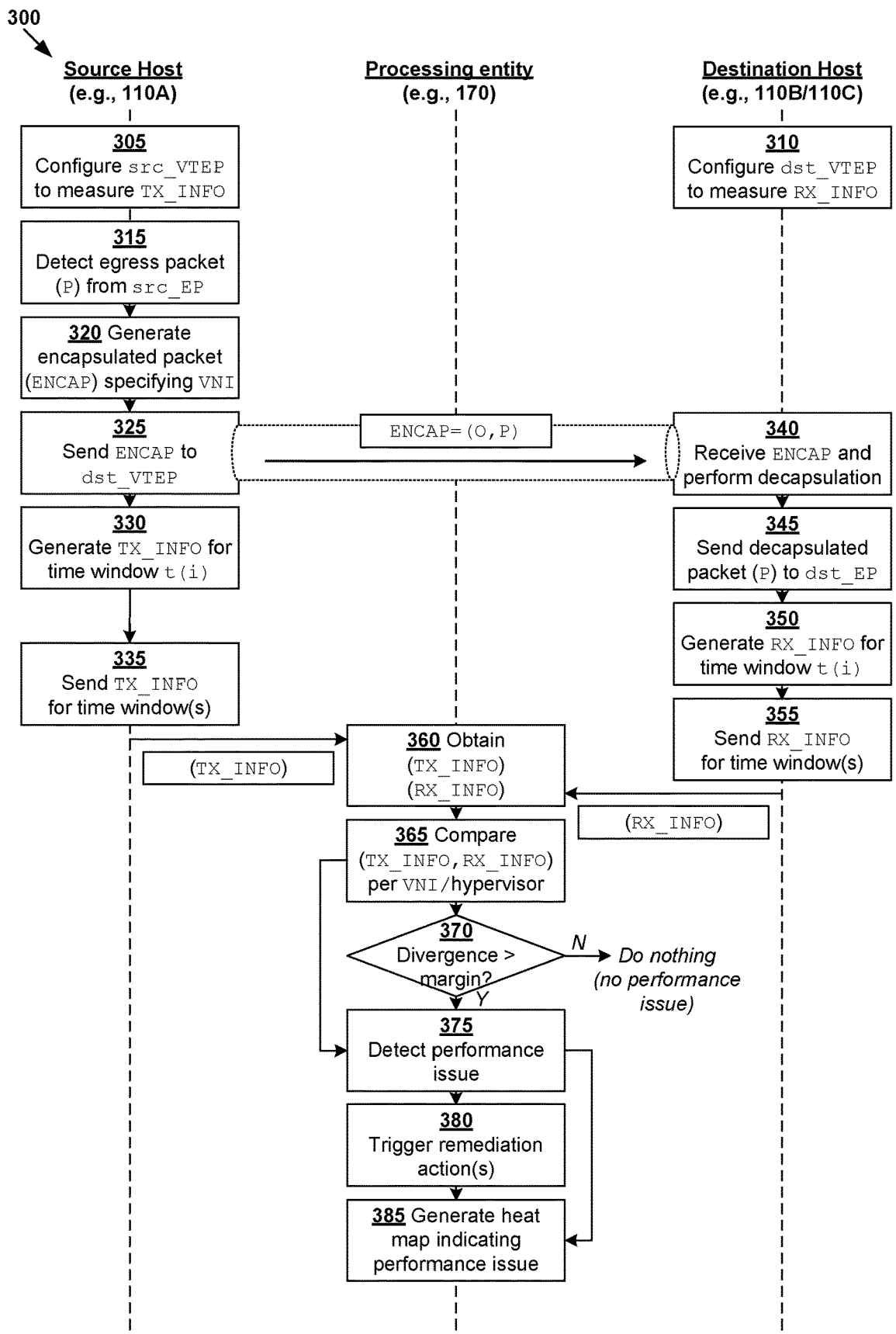
FIG. 3 is a flowchart of an example detailed process of logical overlay network monitoring.

FIG. 3 is a flowchart of example detailed process 300 for logical overlay network monitoring. Example process 300 may include one or more operations, functions, or actions illustrated at 305 to 385. The various operations, functions or actions may be combined into fewer blocks, divided into additional blocks, and/or eliminated depending on the desired implementation. Example process 300 may be implemented by any suitable host 110A/110B/110C (e.g., using VTEP 119A/119B/119C at hypervisor 114A/114B/114C), monitoring entity 180, etc. The example in FIG. 3 will be explained using FIG. 4, which is a schematic diagram illustrating example configuration 400 to facilitate logical overlay network monitoring.

At 305 and 310 in FIG. 3, management entity 170/174 may configure hosts 110A-C using control information. In the example in FIG. 4, control information 410/420/430 may instruct host 110A/110B/110C to perform logical overlay network monitoring at multiple time points. For example in FIG. 4, VM1 131, VM2 132 and VM5 135 are connected to first logical switch 401 (labelled "LS1") associated with a first logical overlay network with VNI=5000. In another example, VM3 133 and VM4 134 are connected to second logical switch 402 (labelled "LS2") associated with a second logical over network with VNI=6000. Logical switches 401-402 are connected via logical DR 403, which is collectively implemented by hosts 110A-C.

Control information 410/420/430 may configure a monitoring session for a particular logical overlay network (e.g., VNI=5000 only), or multiple logical overlay networks (e.g., both VNI=5000 and 6000) on host 110A/110B/110C. Depending on the desired implementation, blocks 305-310 may be initiated in response to a request from a user (e.g., network administrator). The request may be receive via any suitable user interface supported by SDN manager 170, such as application programming interface (API), graphical user interface (GUI), command line interface (CLI), etc.

Example Monitoring

FIG. 3 will now be explained using FIG. 5, which is a schematic diagram illustrating first example of logical overlay network monitoring 500 in SDN environment 100. In the example in FIG. 5, consider two example packet flows via first logical switch LS1 401 associated with VNI=5000. A first packet flow is between VM1 131 on host-A 110A and VM2 132 on host-B 110B, and a second packet flow between VM1 131 and VM5 135 on host-C 110C.

(a) Encapsulated Packet Handling

In relation to the first packet flow, in response to detecting first egress packet 510 (labelled "P1") from source endpoint=VM1 131, source VTEP-A 119A may generate and send first encapsulated packet 520 to destination VTEP-B 119B. First egress packet 510 includes an inner header specifying source address information (IP-VM1, MAC-VM1) of VM1 131, and destination address information (IP-VM2, MAC-VM2) of VM2 132. See blocks 315, 320 and 325 in FIG. 3.

First encapsulated packet 520 is generated by encapsulating egress packet 510 with an outer header (labelled "O1") specifying source (IP-A, MAC-A) associated with VTEP-A 119A, and destination (IP-B, MAC-B) associated VTEP-B 119B. First encapsulated packet 520 also specifies VNI=5000 on which VM1 131 and VM2 132 are deployed. At host-B 110B, in response to detecting first encapsulated packet 520, VTEP-B 119B performs decapsulation and sends decapsulated packet 530 (labelled "P1") to destination endpoint=VM2 132. See blocks 340 and 345 in FIG. 3.

(b) Metric Information

To facilitate monitoring of VNI=5000, hosts 110A-C may collect metric information for processing by network monitoring entity 180. Hosts 110A-C may send metric information to network monitoring entity 180 directly or via management entity 170/174. Additionally or alternatively, hosts 110A-C may store metric information in a data store for subsequent retrieval by network monitoring entity 180. To reduce the overhead on the forwarding plane at runtime, certain bits of each encapsulated packet may be collected to identify the relevant logical overlay network and VTEP pair, such as VNI, VTEP IP addresses, VTEP labels, etc.

Figure 5:
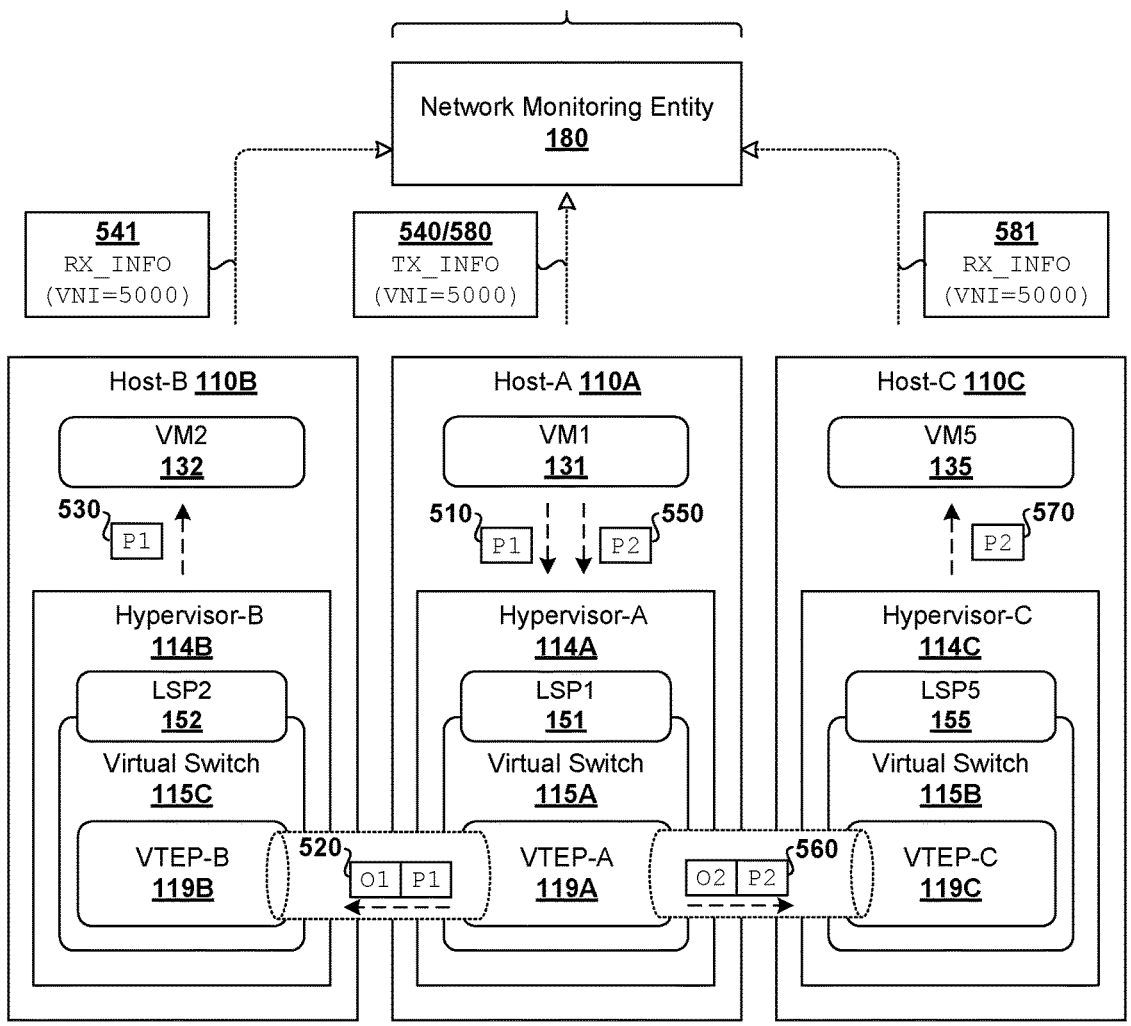
FIG. 5 is a schematic diagram illustrating a first example logical overlay network monitoring.

At 540 in FIG. 5, network monitoring entity 180 may obtain egress metric information (see "TX_INFO," where TX=transmit or sender-side) that is associated with (egress) encapsulated packet 520 sent from host-A 110A. At 541, network monitoring entity 180 may obtain ingress metric information (see "RX_INFO," where RX=receive or receiver-side) that is associated with (ingress) encapsulated packet 520 received by host-B 110B. See blocks 330-335 and 350-360 in FIG. 3.

The above may be repeated for a second packet flow between VM1 131 and VM5 135 in VNI=5000. At host-A 110A, in response to detecting second egress packet 550 (see "P2"), source VTEP-A 119A may generate and send second encapsulated packet 560 to a destination VTEP-C 119C. Second egress packet 550 includes an inner header addressed from (IP-VM1, MAC-VM1) to (IP-VM5, MAC-VM5) associated with destination VM5 135. Second encapsulated packet 560 includes an outer header (see "O2") that is addressed from source VTEP-A 119A to destination VTEP-C 119C associated with (IP-C, MAC-C). Similarly, network monitoring entity 180 may obtain metric information 580/581 from host 110A/110C.

(c) Divergence

At 365-370 in FIG. 3, network monitoring entity 180 may perform any suitable processing (e.g., comparison, correlation) to identify any divergence between the TX_INFO and RX_INFO. At 375, based on the divergence, network monitoring entity 180 may determine that there is a performance issue (e.g., packet loss) affecting the logical overlay network connectivity between a pair of VTEPs.

Referring to example table 590 in FIG. 5, network monitoring entity 180 may correlate metric information from various hosts 110A-C for a particular VNI (i.e., per-VNI case), and/or for a particular hypervisor (i.e., per-hypervisor case). For the per-VNI case, table 590 may be generated to show metric information associated with every VTEP pair (e.g., 119A-B) for a given VNI (e.g. 5000). For the per-hypervisor case, table 590 may be generated to show metric information associated with a pair of hypervisors (e.g., 114A-B) for a given VNI (e.g., 5000). The per-hypervisor case is useful when a particular hypervisor (e.g., 114A) supports multiple VTEPs for different logical overlay networks (e.g., both 5000 and 6000).

In the example in FIG. 5, metric information associated with multiple time points (ti) may be compared to identify any divergence. For particular time point (ti), c1(ti) may represent a packet count (i.e., number of egress encapsulated packets) or byte count (i.e., amount of data in egress encapsulated packets) from the perspective of source VTEP-A 119A. Similarly, c2(ti) at time point (ti) may represent a packet count (i.e., number of ingress encapsulated packets) or byte count (i.e., amount of data in ingress encapsulated packets) from the perspective of destination VTEP 119B/119C.

Using any suitable time interval or window size (w), each time point may be denoted as ti, where ti=t0+iw and index i∈{0, 1, . . . , N}. In this case, all participating hypervisors 114A-C may be synchronized at a single clock such that they collect metric information at substantially the same frequency. If two datasets are detected to be out of synchronization, the datasets may be discarded. In this case, a synchronization request may be generated and sent to all participating hypervisors. Since hosts 110A-C are synchronized to collect data at both ends of an overlay tunnel, the correlation between TX_INFO and RX_INFO should be relatively high.

The difference between c1(ti) and c2(ti) is denoted as d(ti)=c1(ti)−c2(ti), where c2(ti)<c1(ti). In this case, a "divergence" may be identified by monitoring whether d(ti) exceeds a tolerable margin (or predetermined threshold). Any discrepancy or divergence between two sets of metric information may indicate a performance issue, such as packet loss in physical network 104 and/or at a hypervisor (e.g., NIC or driver level). If packet loss is encountered, the TX_INFO and RX_INFO will start diverging with time. In practice, if all paths between a pair of VTEPs fail completely (i.e., traffic drops completely), then the divergence is expected to grow substantially rapidly. However, if only some of the paths have failed, then divergence is expected to grow at a slower pace. In any case, if divergence is observed, and especially when it grows over time, remediation action(s) may be triggered.

Figure 6A:
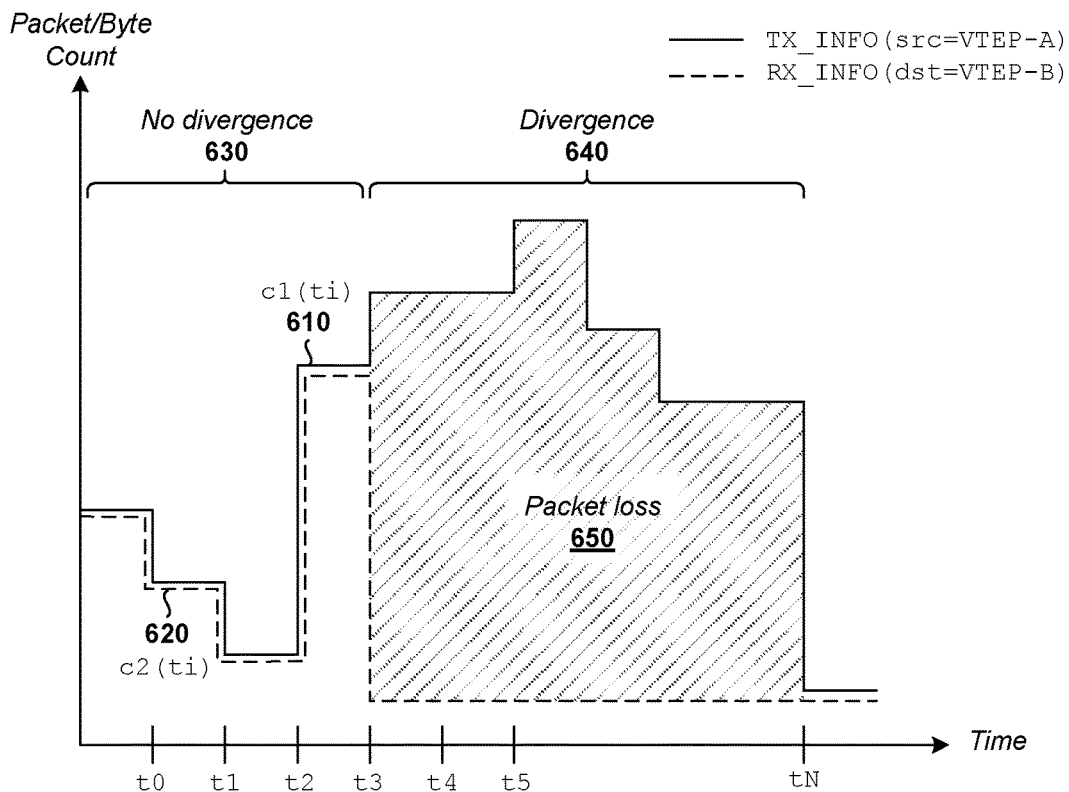
FIGS. 6A-6B are schematic diagrams illustrating first example comparisons between egress metric information and ingress metric information associated with a first overlay tunnel in the example in FIG. 5.
Figure 6B:
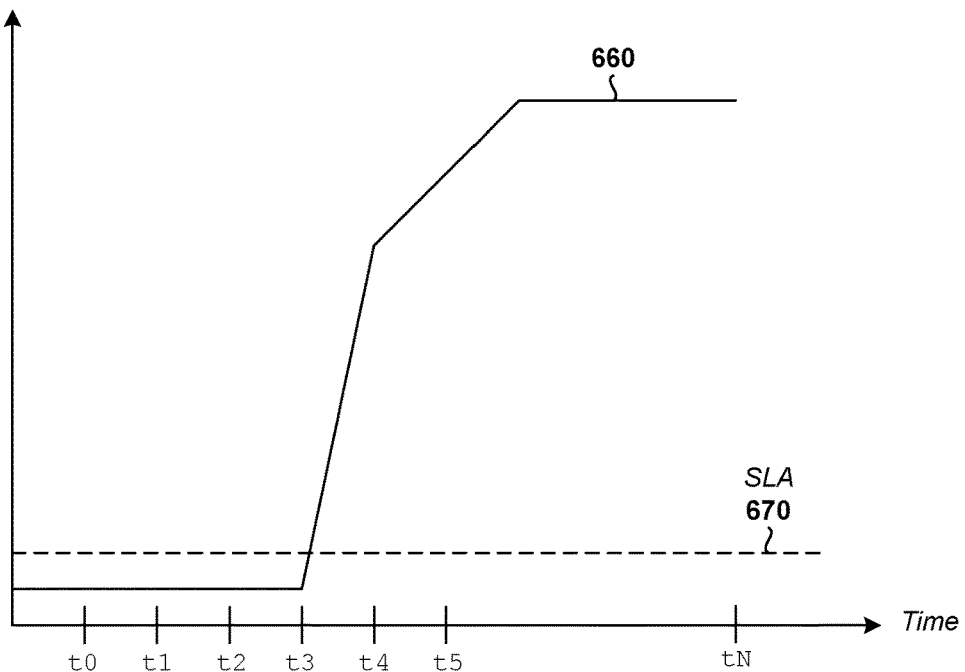

In relation to first VTEP pair=(VTEP-A, VTEP-B), FIGS. 6A-6B are schematic diagrams illustrating example comparisons between egress metric information and ingress metric information associated with a first overlay tunnel in the example in FIG. 5. In FIG. 6A, c1(ti) representing TX_INFO (see 610) and c2(ti) representing RX_INFO (see 620) may be compared to detect a period of no divergence (see 630), followed by a period of divergence (see 640). The divergence indicates a large amount of packet loss (see 650) starting from time point=t3. In FIG. 6B, the amount packet loss (see 660) over multiple time points is compared against a tolerable margin specified in a service level agreement (SLA). For example, SLA=2% (see 680) is not satisfied when the divergence is observed.

Figure 7A:
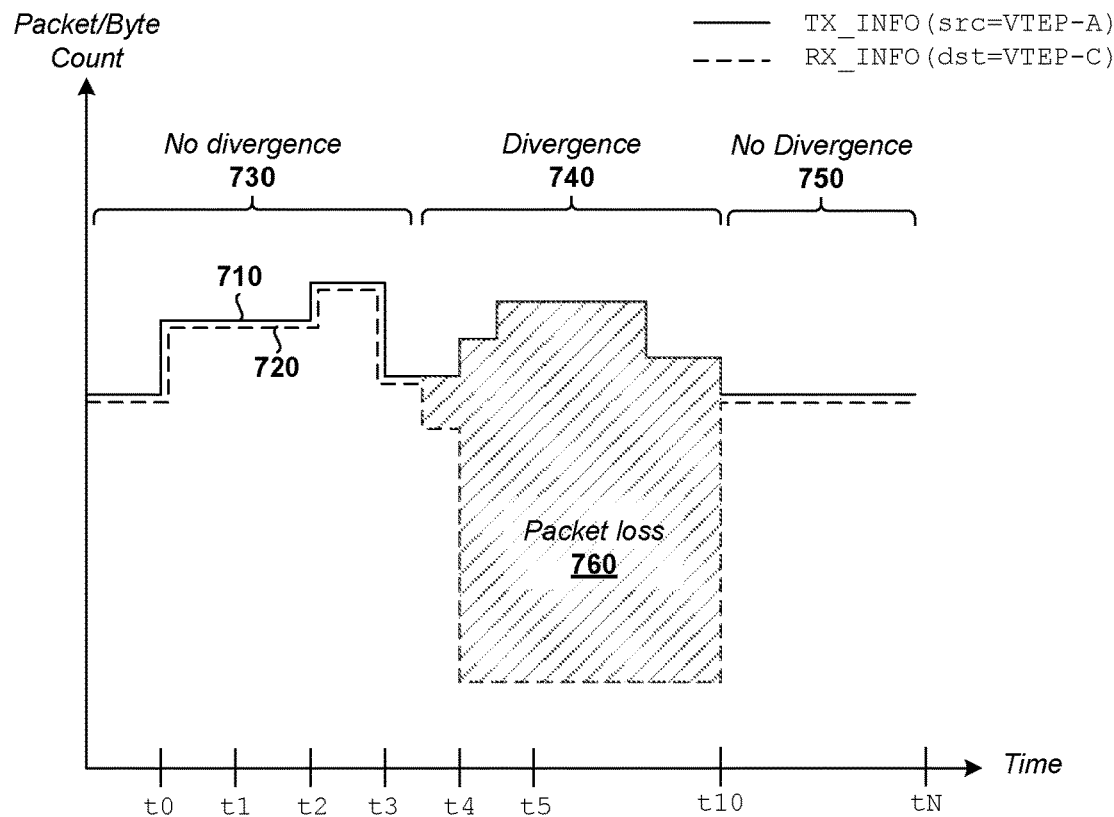
FIGS. 7A-7B are schematic diagrams illustrating second example comparisons between egress metric information and ingress metric information associated with a second overlay tunnel in the example in FIG. 5.
Figure 7B:
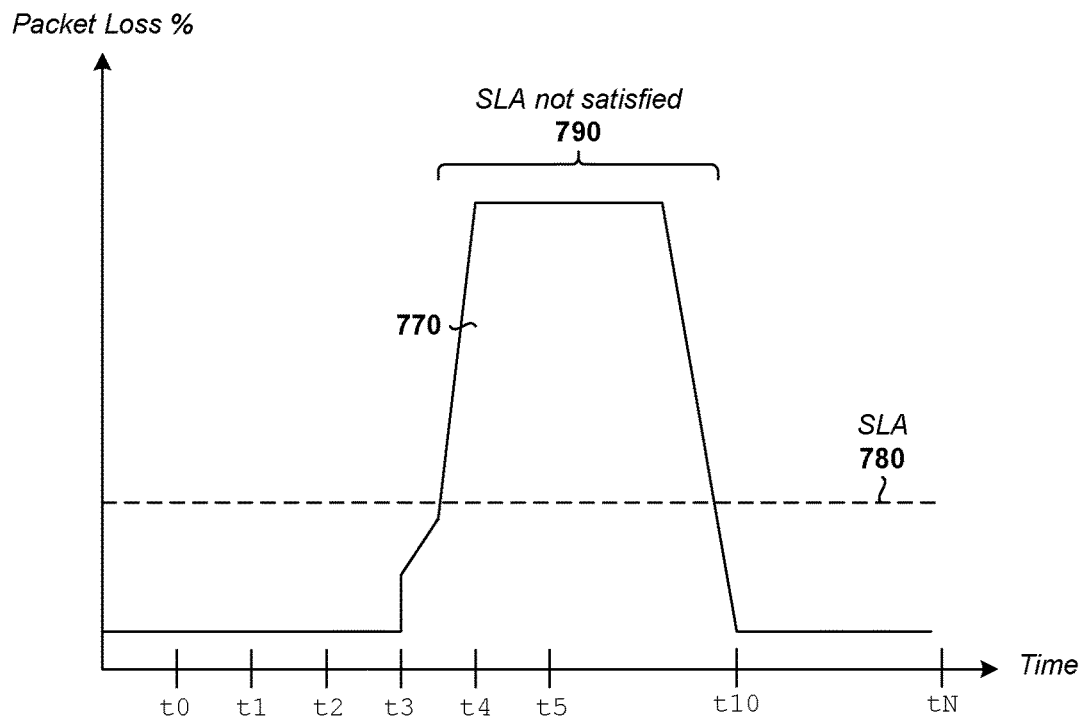

In relation to second VTEP pair=(VTEP-A, VTEP-C), FIGS. 7A-7B are schematic diagrams illustrating example comparisons between egress metric information and ingress metric information associated with a second overlay tunnel in the example in FIG. 5. In FIG. 7A, metric information (see 710-720) may be compared to detect a period of no divergence (see 730), divergence (see 740) and no divergence again (see 750). The divergence at 740 may indicate a large amount of packet loss (see 760) over (t4, . . . , t10). In FIG. 7B, the amount packet loss (see 770) exceeds the SLA (see 780).

Although exemplified using packet loss in FIGS. 6A-7B, it should be understood examples of the present disclosure may be implemented to detect any other performance issue(s). For example, a divergence between TX_INFO and RX_INFO may be used to identify performance issue relating to latency, throughput, jitter, any combination thereof. In the case of latency, there might be a high correlation in the packet count or byte count in RX_ with that in TX_INFO, but a relatively high latency (e.g., exceeds a predetermined threshold) might be observed.

(d) Remediation Action(s)

At 375-380, in response to detecting a performance issue based on a divergence between TX_INFO and RX_INFO, network monitoring entity 180 may trigger any suitable remediation action(s). A remediation action may be triggered by generating and sending a notification to management entity 170/174, or any other entity (e.g., distributed resource scheduling (DRS) component). In practice, whenever a divergence is observed (and especially if the divergence grows over time), physical network 104 should be examined to resolve the performance issue.

For example in FIG. 5, in response to detecting a performance issue affecting VTEP pair=(VTEP-A, VTEP-B) and the performance issue is not resolved within a time frame, source VM1 131 may be migrated from host-A 110A to host-B 110B, or destination VM2 132 from host-B 110B to host-A 110A. This way, intelligent decisions may be made at run time to place both source VM1 131 and destination VM2 132 on the same hypervisor 114A/114B, thereby avoiding any reliance on physical network 104 and associated network outages. Since tunneled traffic usually traverses several physical hops that have limited capacity on physical network 104, each physical hop, any optimization of the utilization of physical network 104 should improve the overall network performance.

Heat Map Generation

Figure 8:
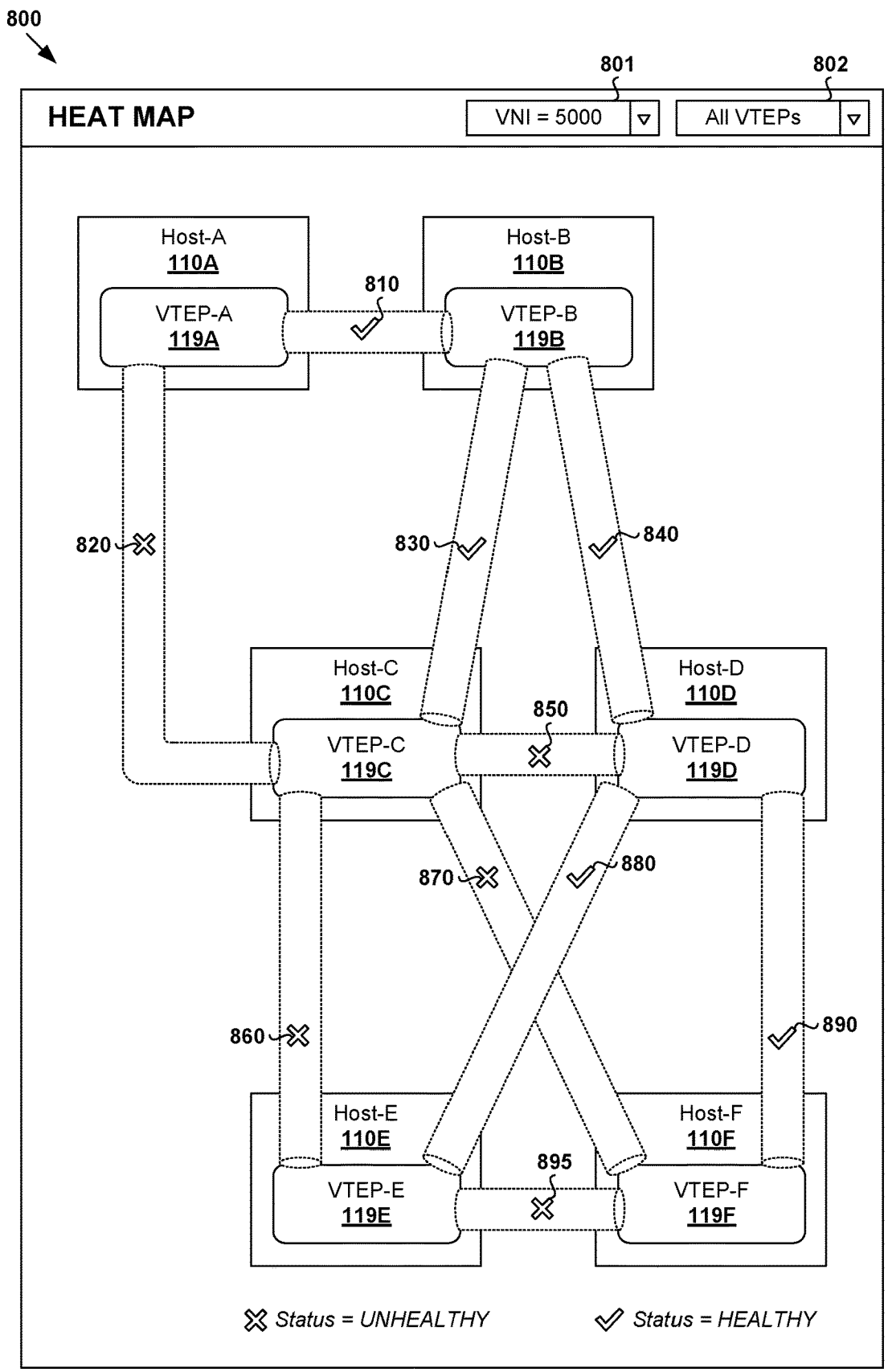
FIG. 8 is a schematic diagram illustrating an example heat map associated with multiple pairs of virtual tunnel endpoints (VTEPs)

FIG. 8 is a schematic diagram illustrating example heat map 800 associated with multiple pairs of virtual tunnel endpoints (VTEPs). In the example in FIG. 8, heat map 800 may be generated by network monitoring entity 800 based on performance issue(s) identified according to blocks 375 and 380 in the example in FIG. 3. Based on a user's selection (see 801), heat map 800 may be generated to indicate a tunnel status (i.e., whether performance issue is detected) of a particular VNI or multiple VNIs. Additionally or alternatively, heat map 800 may be generated based on a user's selection of a particular VTEP pair, or multiple VTEP pairs (see 802).

For VNI=5000, heat map 800 shows various hosts 110A-F that implement respective VTEPs 119A-F, which are interconnected via various overlay tunnels. At 810, a first overlay tunnel between VTEP pair=(VTEP-A, VTEP-B) is determined to be HEALTHY (i.e., no performance issue). At 820, a second overlay tunnel between (VTEP-A, VTEP-C) is UNHEALTHY (i.e., performance issue detected). At 830, a first overlay tunnel between (VTEP-B, VTEP-C) is indicated to be HEALTHY.

The examples discussed using FIGS. 3-7B may be performed for other VTEP pairs in FIG. 8, the explanation of which is not repeated here for brevity. For example, heat map 800 indicates that status=HEALTHY for (VTEP-B, VTEP-D), (VTEP-D, VTEP-E) and (VTEP-D, VTEP-F); see 840, 880 and 890. Further, heat map 800 indicates that status=UNHEALTHY for (VTEP-C, VTEP-D), (VTEP-C, VTEP-E), (VTEP-C, VTEP-F) and (VTEP-E, VTEP-F); see 850, 860, 870 and 895.

In practice, the tunnel status associated with each VTEP pair may change over time and reflected on a user interface supported by network monitoring entity 180 dynamically in real time. Within a given time period, heat map 800 may indicate a tunnel status in green to indicate that packet losses are within a tolerable margin, and red if packet losses exceed the margin. Tunneled statistics may be aggregated for a particular logical network associated with a data center tenant, or multiple logical networks.

Multicast and Broadcast Traffic

Figure 4:
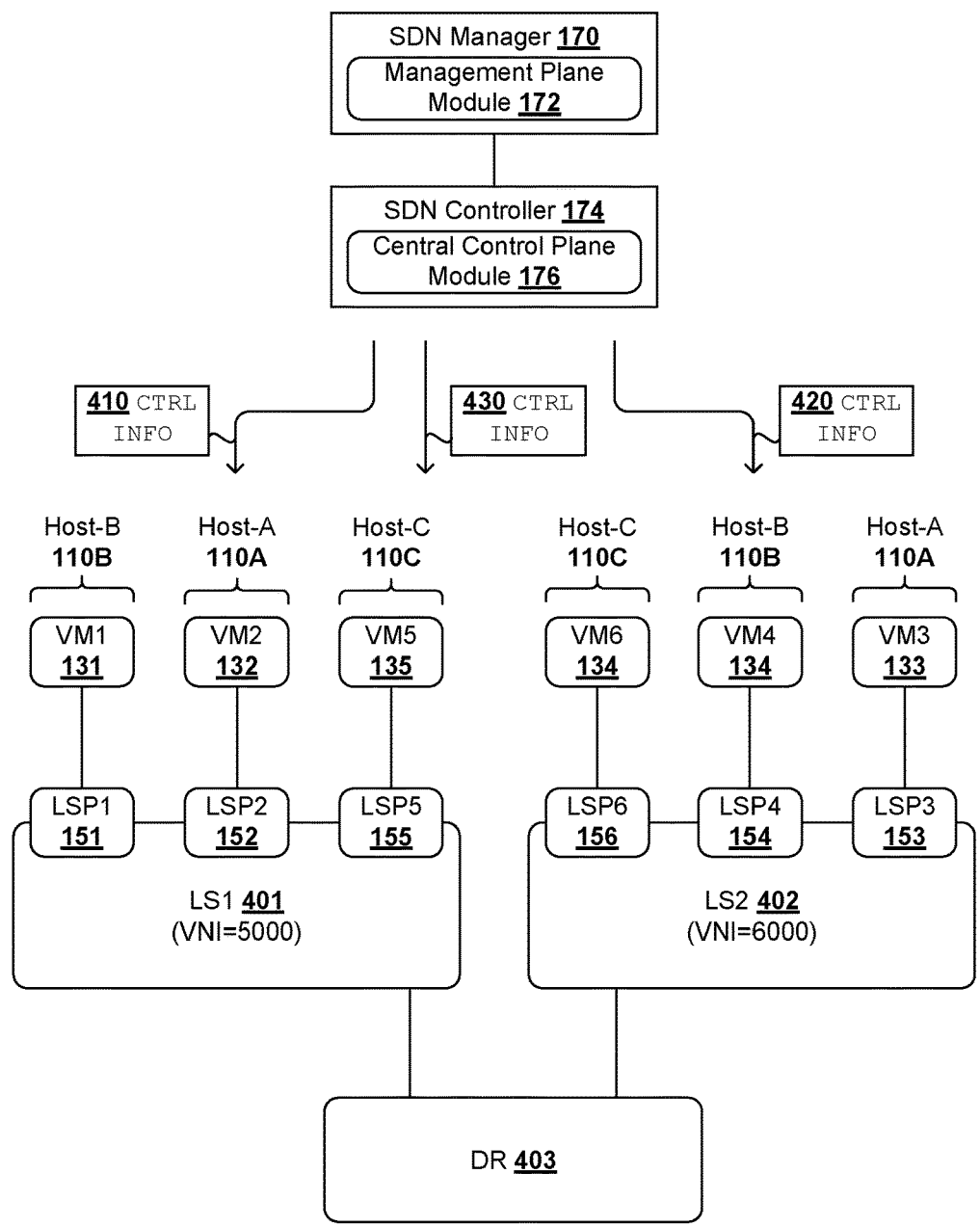
FIG. 4 is a schematic diagram illustrating an example configuration to facilitate logical overlay network monitoring.
Figure 9:
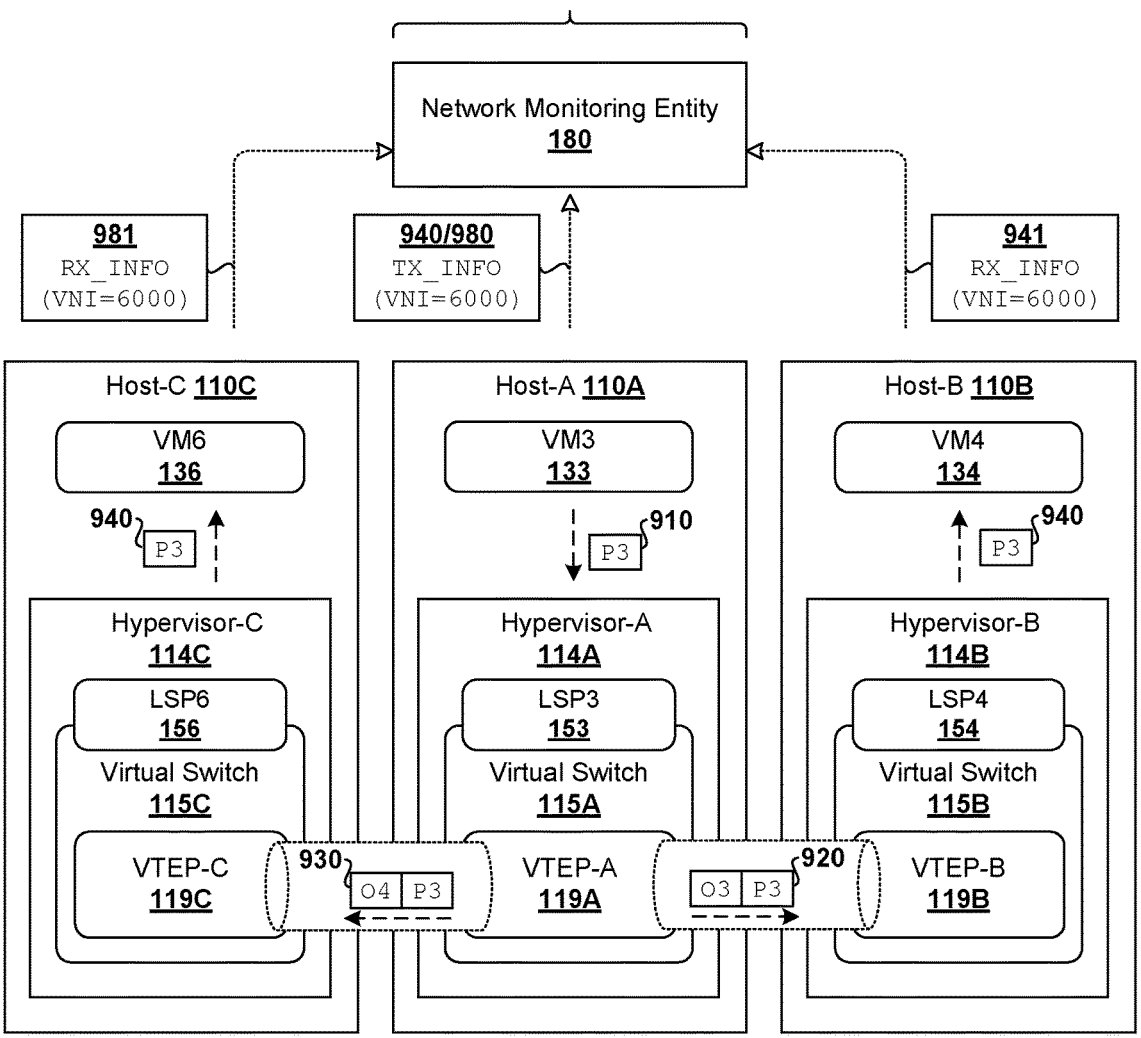
FIG. 9 is a schematic diagram illustrating a second example logical overlay network monitoring.

Examples of the present disclosure may be implemented for any suitable traffic, such as unicast traffic (see FIG. 5), multicast and broadcast traffic (see FIG. 9). In particular, FIG. 9 is a schematic diagram illustrating a second example logical overlay network monitoring. Referring also to FIG. 4, consider logical overlay network connectivity provided by second logical switch LS2 402 for VNI=6000.

In relation to multicast traffic, VM3 133 on host-A 110A may send a multicast packet (see "P3" 910) that is addressed to (IP address=IP-MCAST, MAC address=MAC-MCAST) associated with a multicast group that includes VM4 134 on host-B 110B and VM6 136 on host-C 110C. In this case, a first encapsulated packet (see 920) is sent from VTEP-A 119A to VTEP-B 119B, and a second encapsulated packet (see 930) from VTEP-A 119A to VTEP-C 119C.

In relation to broadcast traffic, VM3 133 on host-A 110A may broadcast an egress packet (see "P3" 910) within VNI=6000. In this case, since VM4 134 and VM6 136 are located in VNI=6000, a first encapsulated packet (see 920) is sent from VTEP-A 119A to VTEP-B 119B, and a second encapsulated packet (see 930) from VTEP-A 119A to VTEP-C 119C. Similar to the example in FIG. 5, network monitoring entity 180 may obtain and process metric information (see TX_INFO 940/980 and RX_INFO 941/981) collected by hosts 110A-C relating to multicast and/or broadcast traffic. The examples discussed using FIGS. 3-8 are also applicable here, the explanation of which is not repeated for brevity.

Container Implementation

Although explained using VMs 131-136, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs131- 136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to perform logical overlay network monitoring according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform logical overlay network monitoring, wherein the method comprises:
    obtaining, by the computer system, egress metric information associated with egress encapsulated packets that are sent by a source virtual tunnel endpoint (VTEP) to a destination VTEP over a logical overlay network, wherein the source VTEP is on a source host and the destination VTEP is on a destination host;
    obtaining, by the computer system, ingress metric information associated with ingress encapsulated packets that are received by the destination VTEP from the source VTEP over the logical overlay network;
    performing, by the computer system, a comparison to identify a divergence between the egress metric information and the ingress metric information;
    based on the divergence, detecting, by the computer system, a performance issue affecting logical overlay network connectivity between the source VTEP and the destination VTEP; and
    in response to detecting the performance issue, performing one or more of the following remediation actions: (a) triggering a migration of a source virtualized computing instance that is connected with the source VTEP on the source host; and (b) triggering a migration of a destination virtualized computing instance that is connected with the destination VTEP on the destination host.

2. The method of claim 1, wherein performing the comparison comprises:
    performing the comparison to identify the divergence between (a) the egress metric information specifying a first number of egress encapsulated packets sent by the source VTEP at multiple time points, and (b) the ingress metric information specifying a second number of ingress encapsulated packets received by the destination VTEP at the multiple time points.

3. The method of claim 1, wherein performing the comparison comprises:
    performing the comparison to identify the divergence between (a) the egress metric information specifying a first amount of data in the egress encapsulated packets sent by the source VTEP at multiple time points, and (b) the ingress metric information specifying a second amount of data in the ingress encapsulated packets received by the destination VTEP.

4. The method of claim 1, wherein obtaining the egress metric information and the ingress metric information comprises:
    obtaining the egress metric information associated with egress broadcast packets, being the egress encapsulated packets, that are sent by the source VTEP in a broadcast manner within the logical overlay network; and
    obtaining the ingress metric information associated with ingress broadcast packets, being the ingress encapsulated packets, that are received by the destination VTEP and at least one other destination VTEP.

5. The method of claim 1, wherein obtaining the egress metric information and the ingress metric information comprises:
    obtaining the egress metric information associated with egress multicast packets, being the egress encapsulated packets, that are sent by the source VTEP in a multicast manner; and
    obtaining the ingress metric information associated with ingress multicast packets, being the ingress encapsulated packets, that are received by the destination VTEP and at least one other destination VTEP.

6. The method of claim 1, wherein the method further comprises:
generating a heat map indicating a tunnel status for multiple VTEP pairs that include the source VTEP and the destination VTEP, wherein the heat map indicates that the tunnel status between the source VTEP and the destination VTEP is unhealthy based on the performance issue.

7. A non-transitory computer-readable storage medium that includes a set of instructions which, in response to execution by a processor of a computer system, cause the processor to perform a method of logical overlay network monitoring, wherein the method comprises:
obtaining, by the computer system, egress metric information associated with egress encapsulated packets that are sent by a source virtual tunnel endpoint (VTEP) to a destination VTEP over a logical overlay network, wherein the source VTEP is on a source host and the destination VTEP is on a destination host;
obtaining, by the computer system, ingress metric information associated with ingress encapsulated packets that are received by the destination VTEP from the source VTEP over the logical overlay network;
performing, by the computer system, a comparison to identify a divergence between the egress metric information and the ingress metric information;
based on the divergence, detecting, by the computer system, a performance issue affecting logical overlay network connectivity between the source VTEP and the destination VTEP; and
in response to detecting the performance issue, performing one or more of the following remediation actions: (a) triggering a migration of a source virtualized computing instance that is connected with the source VTEP on the source host; and (b) triggering a migration of a destination virtualized computing instance that is connected with the destination VTEP on the destination host.

8. The non-transitory computer-readable storage medium of claim 7, wherein performing the comparison comprises:
performing the comparison to identify the divergence between (a) the egress metric information specifying a first number of egress encapsulated packets sent by the source VTEP at multiple time points, and (b) the ingress metric information specifying a second number of ingress encapsulated packets received by the destination VTEP at the multiple time points.

9. The non-transitory computer-readable storage medium of claim 7, wherein performing the comparison comprises:
performing the comparison to identify the divergence between (a) the egress metric information specifying a first amount of data in the egress encapsulated packets sent by the source VTEP at multiple time points, and (b) the ingress metric information specifying a second amount of data in the ingress encapsulated packets received by the destination VTEP.

10. The non-transitory computer-readable storage medium of claim 7, wherein obtaining the egress metric information and the ingress metric information comprises:
obtaining the egress metric information associated with egress broadcast packets, being the egress encapsulated packets, that are sent by the source VTEP in a broadcast manner within the logical overlay network; and
obtaining the ingress metric information associated with ingress broadcast packets, being the ingress encapsulated packets, that are received by the destination VTEP and at least one other destination VTEP.

11. The non-transitory computer-readable storage medium of claim 7, wherein obtaining the egress metric information and the ingress metric information comprises:
obtaining the egress metric information associated with egress multicast packets, being the egress encapsulated packets, that are sent by the source VTEP in a multicast manner; and
obtaining the ingress metric information associated with ingress multicast packets, being the ingress encapsulated packets, that are received by the destination VTEP and at least one other destination VTEP.

12. The non-transitory computer-readable storage medium of claim 7, wherein the method further comprises:
generating a heat map indicating a tunnel status for multiple VTEP pairs that include the source VTEP and the destination VTEP, wherein the heat map indicates that the tunnel status between the source VTEP and the destination VTEP is unhealthy based on the performance issue.

13. A computer system configured to perform logical overlay network monitoring, wherein the computer system comprises:
a processor; and
a non-transitory computer-readable medium having stored thereon instructions that, when executed by the processor, cause the processor to perform the following:
obtaining egress metric information associated with egress encapsulated packets that are sent by a source virtual tunnel endpoint (VTEP) to a destination VTEP over a logical overlay network, wherein the source VTEP is on a source host and the destination VTEP is on a destination host;
obtaining ingress metric information associated with ingress encapsulated packets that are received by the destination VTEP from the source VTEP over the logical overlay network;
performing a comparison to identify a divergence between the egress metric information and the ingress metric information;
based on the divergence, detecting a performance issue affecting logical overlay network connectivity between the source VTEP and the destination VTEP; and
in response to detecting the performance issue, performing one or more of the following remediation actions: (a) triggering a migration of a source virtualized computing instance that is connected with the source VTEP on the source host; and (b) triggering a migration of a destination virtualized computing instance that is connected with the destination VTEP on the destination host.

14. The computer system of claim 13, wherein the instructions for performing the comparison cause the processor to:
perform the comparison to identify the divergence between (a) the egress metric information specifying a first number of egress encapsulated packets sent by the source VTEP at multiple time points, and (b) the ingress metric information specifying a second number of ingress encapsulated packets received by the destination VTEP at the multiple time points.

15. The computer system of claim 13, wherein the instructions for performing the comparison cause the processor to:
perform the comparison to identify the divergence between (a) the egress metric information specifying a first amount of data in the egress encapsulated packets sent by the source VTEP at multiple time points, and (b) the ingress metric information specifying a second amount of data in the ingress encapsulated packets received by the destination VTEP.

16. The computer system of claim 13, wherein the instructions for obtaining the egress metric information and the ingress metric information cause the processor to:
   obtain the egress metric information associated with egress broadcast packets, being the egress encapsulated packets, that are sent by the source VTEP in a broadcast manner within the logical overlay network; and
   obtain the ingress metric information associated with ingress broadcast packets, being the ingress encapsulated packets, that are received by the destination VTEP and at least one other destination VTEP.

17. The computer system of claim 13, wherein the instructions for to obtaining the egress metric information and the ingress metric information cause the processor:
   obtain the egress metric information associated with egress multicast packets, being the egress encapsulated packets, that are sent by the source VTEP in a multicast manner; and
   obtain the ingress metric information associated with ingress multicast packets, being the ingress encapsulated packets, that are received by the destination VTEP and at least one other destination VTEP.

18. The computer system of claim 13, wherein the instructions further cause the processor to:
   generate a heat map indicating a tunnel status for multiple VTEP pairs that include the source VTEP and the destination VTEP, wherein the heat map indicates that the tunnel status between the source VTEP and the destination VTEP is unhealthy based on the performance issue.

\* \* \* \* \*